Sept. 16, 1924.
J. F. NEHLIG ET AL
1,509,021
COUPLING FOR DRAIN PIPES AND THE LIKE
Filed April 9, 1924
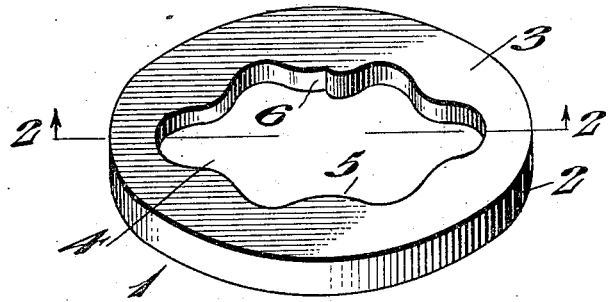
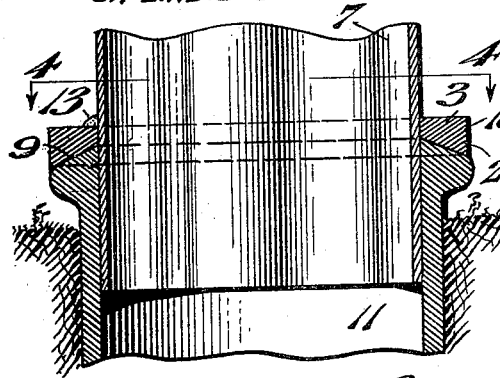
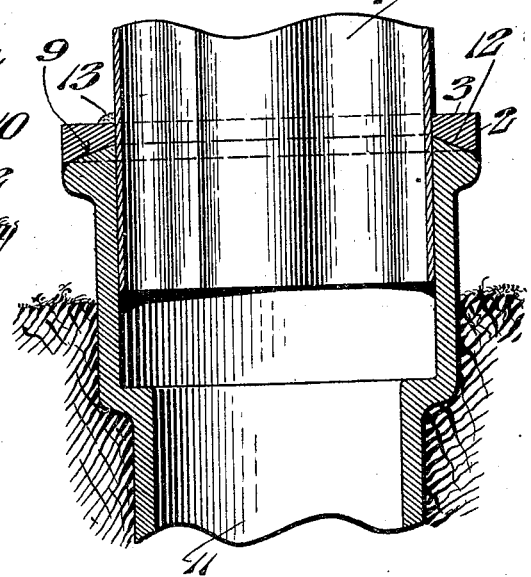
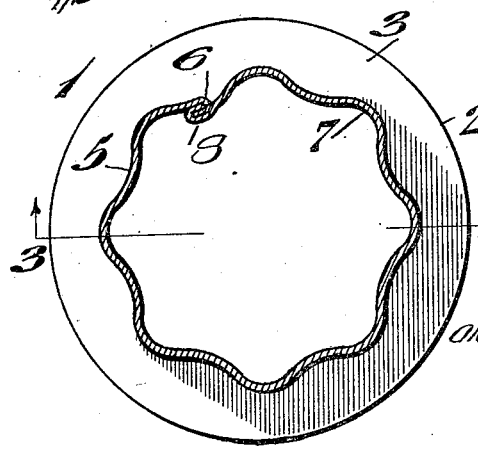
INVENTORS
John F. Nehlig and
Harry K. Nehlig
BY
Niederstein & Fairbanks
ATTORNEYS Patented Sept. 16, 1924.

1,509,021

UNITED STATES PATENT OFFICE.

JOHN F. NEHLIG, OF ASHLAND, AND HARRY K. NEHLIG, OF LAUREL SPRINGS, NEW JERSEY.

COUPLING FOR DRAIN PIPES AND THE LIKE.

Application filed April 9, 1924. Serial No. 705,196.

*To all whom it may concern:*

Be it known that we, JOHN F. NEHLIG, a citizen of the United States, residing at Ashland, in the county of Camden and State of New Jersey, and HARRY K. NEHLIG, a citizen of the United States, residing at Laurel Springs, in the county of Camden and State of New Jersey, have invented a certain new and useful Coupling for Drain Pipes and the like, of which the following is a specification.

This invention, generally stated, relates to making connection between a soil pipe and water-spout of the fluted or corrugated type and has more especial relation to a coupling employed in making such connection.

One object of the present invention is to provide for using both the bell and the beaded end of a soil pipe to accommodate a corrugated water-spout and in providing a coupling for co-operatively seating upon either of said pipe ends to close such spaces as occur between the corrugated surface of the spout and the inner wall of the drain pipe. A further object is to provide a novel form of coupling in which the corrugations of the central opening at one point are mutilated to co-operatively engage with the seam of a corrugated rain spout. Another object is to provide a coupling of the character stated in which the coupling under surface is inwardly tapered in order to co-operatively seat upon either the bell or beaded end of a soil pipe.

Other and further objects not at this time appearing will appear hereinafter.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in perspective of a coupling embodying the invention.

Fig. 2, is a view in section taken upon the line 2—2 of Fig. 1.

Fig. 3, is a view in section taken upon the line 3—3 of Fig. 4.

Fig. 4, is a view in section taken upon line 4—4 of Fig. 3, and

Fig. 5, is a view in vertical section illustrating the coupling of the invention seated upon the bell end of a soil pipe.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In connecting water spouts to soil pipes it is the practice among some tinsmiths to use the beaded end of a soil pipe and among others to use the bell end of a soil pipe. In either case when the fluted water-spout is inserted within a soil pipe there are present between the water-spout and the soil pipe a plurality of open spaces through which dust, dirt, twigs and other foreign matter may pass to the soil pipe the disadvantages of which are obvious. The present invention contemplates employing a coupling to overcome the above described disadvantageous features and provide a coupling which may be readily seated upon either the beaded end or the bell end of the soil pipe. Referring now specifically to the drawings, the coupling is shown as being a substantially ringed shaped member 1 having vertical side walls 2 and a flat top 3. The flat top 3 is provided with a central opening 4 the wall of which is corrugated or fluted as at 5. The corrugations or flutes are mutilated at one point as at 6 so that when a corrugated rain-spout 7 is inserted through the coupling 1 the seam 8 of the water-spout may register with and snugly fit the part 6 just described. The end face of the coupling 1 tapers inwardly as at 9 from the outer circumference of the ring member toward the opening 4. This is so that the coupling may readily seat itself upon either the beaded end 10 of the soil pipe 11 or upon the bell end 12 of the soil pipe 11. The former seating of parts is shown in Fig. 3 while the latter seating of parts is shown in Fig. 5. Obviously, with a water-spout inserted in the soil pipe to closely hug the walls thereof and having seated upon the soil pipe end of the coupling 1, as previously described, the open spaces that are normally present in conventional water-spout connections are obviated and said spaces closed as is clearly indicated in Fig. 4. If desired, the spout and ring 1 may be secured together as by solder 13, see Figs. 3 and 5, although this is not absolutely necessary. From the above description it is apparent that the coupling 1 is so shaped and constructed as to be readily seated upon either end of a drain pipe which in the tinsmith art is a very important factor.

Having thus described our invention, what we claim as new and desire to secure by Letters Patent, is:

1. A coupling of the character stated comprising a ring-like member the central opening of which has a continuous fluted or corrugated wall and the under-face of which member is inwardly tapered.

2. A coupling of the character stated comprising a ring-like member the wall of the central opening of which is of a thickness less than the thickness of the circumferential wall of said member, said opening wall being corrugated or fluted and the under surface of said member tapering inwardly from its circumferential edge.

3. A coupling of the character stated comprising a ring-like member the central opening of which has a continuous fluted or corrugated wall the same fluted portion being relatively distorted at one point for rain-spout seam accommodation, and the under-face of which member is inwardly tapered.

4. In a coupling of the character stated, the combination of a soil pipe having its beaded end uppermost, a corrugated rain spout projected thereunto and a ring-like member having a corrugated opening, the corrugations of which closely hug the spout corrugations, seated upon the bead of said soil pipe.

5. In a coupling of the character stated, the combination of a soil pipe having its bell uppermost, a corrugated rain spout projected into said bell and a ring-like member having a corrugated opening, the corrugations of which closely hug the spout corrugations, seated upon said bell.

6. In a coupling of the character stated, the combination of a soil pipe the uppermost end of which is provided with a tapered marginal portion, a corrugated rain spout projected into said pipe and a ring-like member having a corrugated opening, the corrugations of which snugly hug the spout corrugations, seated upon said tapered soil pipe portion, the under surface of said member being shaped to co-act therewith.

7. In a coupling of the character stated, the combination of a soil pipe the uppermost end of which is provided with a tapered marginal portion, a seamed corrugated rain spout projected into said pipe and a ring-like member having a corrugated opening, the corrugations of which snugly hug the spout corrugations including the seam of said spout, seated upon said tapered soil pipe portion, the under surface of said member being shaped to co-act therewith.

8. In a coupling of the character stated, the combination of a soil pipe the uppermost end of which is circular and is provided with a tapered marginal portion, a corrugated rain spout projected into said pipe and a ring-like member having a corrugated opening, the corrugations of which snugly hug the spout corrugations seated upon said tapered soil pipe portion, the under surface of said member being shaped to co-act therewith, the top face of said ring-like member covering the vertical spaces formed between said pipe and spout.

JOHN F. NEHLIG.
HARRY K. NEHLIG.